(12) United States Patent
Amanullah

(10) Patent No.: US 11,746,607 B2
(45) Date of Patent: Sep. 5, 2023

(54) LOST CIRCULATION MATERIAL HAVING TENTACLES

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/644,166

(22) Filed: Dec. 14, 2021

(65) Prior Publication Data

US 2022/0106845 A1    Apr. 7, 2022

Related U.S. Application Data

(62) Division of application No. 17/009,485, filed on Sep. 1, 2020, now Pat. No. 11,236,559.

(51) Int. Cl.
*C09K 8/02* (2006.01)
*E21B 21/00* (2006.01)
*E21B 33/138* (2006.01)

(52) U.S. Cl.
CPC .............. *E21B 21/003* (2013.01); *C09K 8/02* (2013.01); *E21B 33/138* (2013.01)

(58) Field of Classification Search
None
See application file for complete search history.

(56) References Cited

U.S. PATENT DOCUMENTS

| | | | | |
|---|---|---|---|---|
| 4,756,529 A | * | 7/1988 | Stillinger | A63H 3/02 446/268 |
| 4,927,141 A | * | 5/1990 | Paranto | A63B 43/00 446/490 |
| 4,962,926 A | * | 10/1990 | Chen | A63B 43/00 446/490 |
| 5,501,275 A | | 3/1996 | Card et al. | |
| 6,026,534 A | * | 2/2000 | Gonda | A47K 7/03 15/207.2 |
| D536,754 S | * | 2/2007 | Chernick | A63B 43/00 D21/714 |
| 7,402,339 B2 | | 7/2008 | Schmidt et al. | |
| 8,479,817 B2 | | 7/2013 | Shindgikar et al. | |
| 8,607,895 B2 | | 12/2013 | Hoskins | |
| 8,887,808 B2 | | 11/2014 | Kumar et al. | |
| 9,688,901 B2 | | 6/2017 | Fontenot | |
| 9,783,727 B2 | | 10/2017 | Lahman et al. | |
| 9,932,510 B2 | | 4/2018 | Walker et al. | |
| 10,301,523 B2 | | 5/2019 | Savari et al. | |
| 10,724,327 B1 | | 7/2020 | Alouhali et al. | |
| 11,236,559 B1 | * | 2/2022 | Amanullah | E21B 33/138 |
| 11,292,950 B2 | * | 4/2022 | Alouhali | C09K 8/516 |
| 2004/0129460 A1 | | 7/2004 | MacQuoid et al. | |
| 2013/0130947 A1 | | 5/2013 | Brannon et al. | |
| 2013/0160998 A1 | | 6/2013 | Auzerais et al. | |

(Continued)

*Primary Examiner* — Andrew Sue-Ako
(74) *Attorney, Agent, or Firm* — Fish & Richardson P.C.

(57) ABSTRACT

Lost circulation material (LCM) and method including LCM objects each having a centrally-disposed solid core and tentacles extending from the solid core to entangle with tentacles of neighboring LCM objects to treat loss circulation in a wellbore in a subterranean formation. The LCM as solid cores and entangled tentacles at the loss circulation zone collects solids from wellbore fluid to form a barrier to treat the loss circulation.

9 Claims, 3 Drawing Sheets

(56) References Cited

U.S. PATENT DOCUMENTS

| | | |
|---|---|---|
| 2013/0284518 A1 | 10/2013 | Wu et al. |
| 2015/0008044 A1 | 1/2015 | Fontenot |
| 2016/0060501 A1 | 3/2016 | Kefi et al. |
| 2016/0237767 A1 | 8/2016 | Snoswell et al. |
| 2016/0244654 A1 | 8/2016 | Way et al. |
| 2016/0298018 A1 | 10/2016 | Medvedev et al. |
| 2017/0253788 A1 | 9/2017 | Ivanov et al. |
| 2018/0135381 A1 | 5/2018 | Tolman et al. |

* cited by examiner

100

LOST CIRCULATION MATERIAL HAVING TENTACLES

CROSS-REFERENCE TO RELATED APPLICATION(S)

This application is a divisional of and claims the benefit of priority to U.S. patent application Ser. No. 17/009,485, filed on Sep. 1, 2020, the contents of which are incorporated by reference herein.

TECHNICAL FIELD

This disclosure relates to lost circulation material (LCM) for curing lost circulation in a wellbore in a subterranean formation.

BACKGROUND

In oil or gas well drilling, loss circulation occurs when drilling fluid (mud) or cement slurry flows into the subterranean formation instead of flowing up the annulus between the formation and the casing or work string. Loss circulation is the partial or complete loss of drilling fluid or cement slurry to the formation during drilling or cementing operations. Loss circulation can be brought on by natural or induced causes. Natural causes include naturally fractured formations or unconsolidated zones. Induced losses occur when the hydrostatic fluid column pressure exceeds the fracture gradient of the formation and the formation pores break down adequately to receive rather than resist the fluid. For non-cavernous formations, a loss circulation zone may be the result of fractures in the geological formation at the borehole or wellbore. When loss circulation occurs, both drilling fluid and cement slurry can be lost.

Loss circulation material (LCM) is a name for substances added to drilling fluids when drilling fluids are being loss downhole to the subterranean formation. The LCM may be fibrous (e.g., tree bark, shredded cane stalks, mineral fibers, and animal hair), flaky (e.g., mica flakes and pieces of plastic or cellophane sheeting), or granular (e.g., ground and sized limestone, carbonates or marble, wood, nut hulls, Formica, corncobs, or cotton hulls). LCM may be introduced into a mud system to reduce and eventually prevent the flow of drilling fluid into a weak, fractured, or vugular formation. This material may be generally fibrous or plate-like in nature, as suppliers attempt to design slurries that will efficiently bridge over and seal loss zones.

SUMMARY

An aspect relates to a method of treating loss circulation in a wellbore in a subterranean formation, the method including placing fluid having loss circulation material (LCM) objects into the wellbore, each LCM object including tentacles and a centrally-disposed solid core, wherein the tentacles are attached to and extend from the centrally-disposed solid core. The method includes flowing the LCM objects to against the subterranean formation at a loss circulation zone in the wellbore, wherein the tentacles entangle between the LCM objects. The method includes flowing wellbore fluid from the wellbore into the subterranean formation through voids between the tentacles as entangled at the loss circulation zone, and collecting solids from the wellbore fluid on the tentacles as entangled to form a barrier to treat the loss circulation at the loss circulation zone.

Another aspect relates to a method of applying LCM to a wellbore in a subterranean formation, the method including pumping a slurry having base fluid, LCM objects, and solids into the wellbore to a loss circulation zone in the wellbore, the LCM objects including solid cores and tentacles attached to and extending from the solid cores. The method includes allowing the tentacles to entangle between the solid cores at the loss circulation zone, flowing the base fluid through gaps between the tentacles as entangled into the subterranean formation at the loss circulation zone, and collecting the solids on the tentacles as entangled to form a flow barrier to reduce or prevent loss circulation at the loss circulation zone.

Yet another aspect is a LCM object including a solid core that is centrally disposed in the LCM object. The LCM object has tentacles including first tentacles and second tentacles different in material than the first tentacles, the tentacles attached to the solid core and extending from the solid core to entangle with other tentacles of a neighboring LCM object, wherein the LCM object to be placed into a wellbore in a subterranean formation to cure loss circulation in the wellbore.

Yet another aspect relates to a LCM pill to cure loss circulation in a wellbore in a subterranean formation, the LCM pill including LCM objects, wherein each LCM object of the LCM objects has a solid core and tentacles attached to and extending from the solid core, the tentacles including first tentacles and second tentacles different in material than the first tentacles. The LCM pill includes fluid to convey the LCM objects; and solids to be collected on the LCM objects in application.

The details of one or more implementations are set forth in the accompanying drawings and the description below. Other features and advantages will be apparent from the description and drawings, and from the claims.

DETAILED DESCRIPTION

Figure 1:
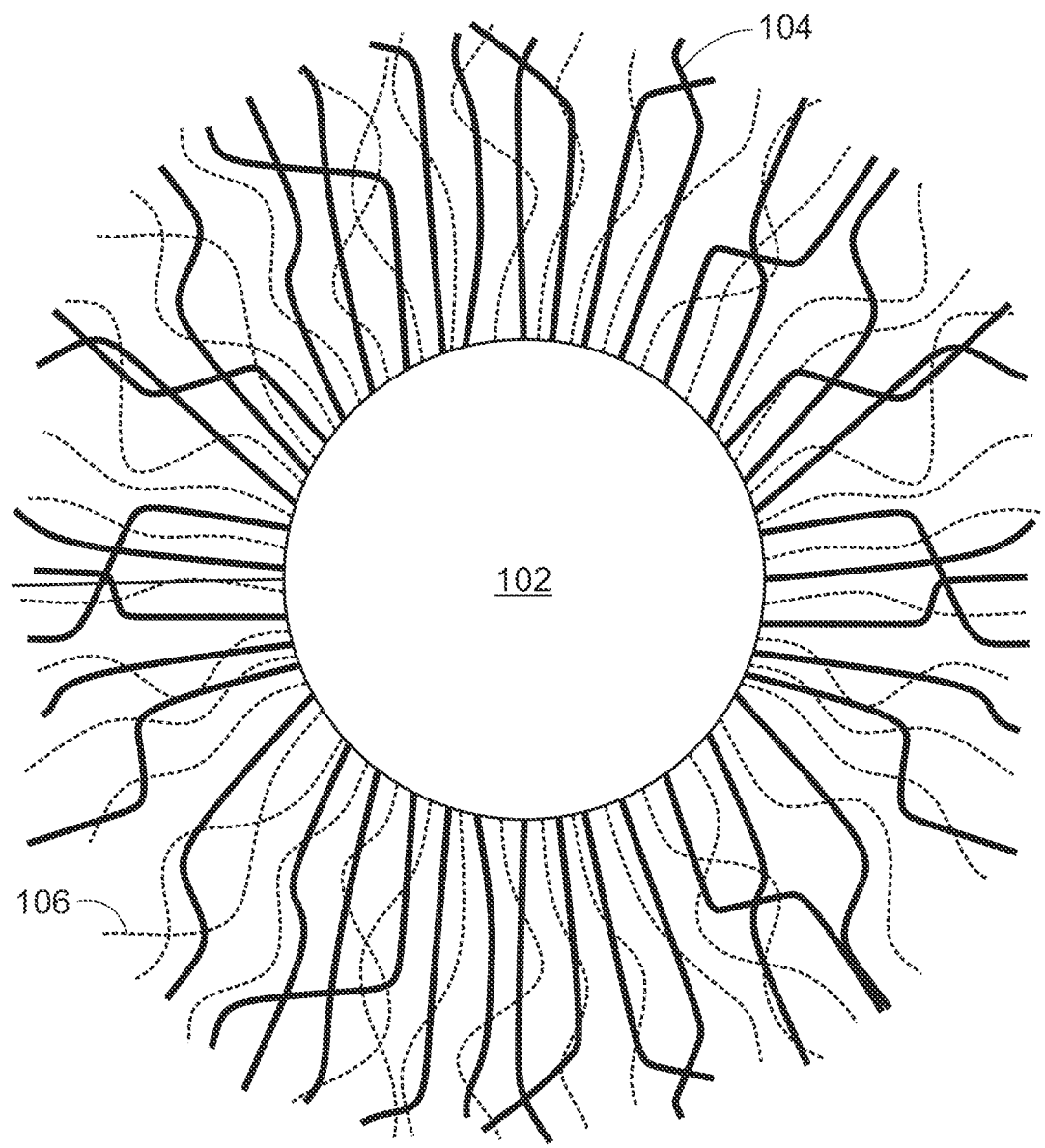
FIG. 1 is a diagram of a lost circulation materials (LCM) object.

Embodiments of the present techniques include a lost circulation material (LCM) object having a solid core that is centrally disposed in the LCM object. The LCM object has tentacles (e.g., elongated fibers) including first tentacles (e.g., each a semi-rigid polymer fiber) and second tentacles (e.g., each an elastic resin fiber). The tentacles are attached to the solid core and extend from the solid core to interface (interact, entangle) with other tentacles of a neighboring LCM object. The LCM object (along with multiple similar or same LCM objects) is placed into a wellbore in a subterranean formation to cure loss circulation in the wellbore. The tentacles as entangled between the LCM objects form a tentacle network (at the loss circulation zone) that initially allows loss of wellbore fluid but that collects solids from the wellbore fluid. The entangled tentacles with the collected solids form a flow barrier to reduce or prevent loss circulation at the loss circulation zone.

Aspects of the present disclosure are directed to treating a loss circulation zone in a wellbore in a subterranean formation. Some aspects relate to the control and mitigation of moderate and severe losses of drilling fluid (mud) or cement slurry while drilling or cementing. Implementations may create a tentacle or fiber network as a flow barrier in fractured, vugular, and cavernous loss zones.

Loss zones having voids, vugs, gaps, fractures, and permeable channels giving fluid conductivity may trigger moderate and severe loss of circulation. Such loss zones may be sealed and blocked to advance drilling or cementing operations. However, traditional fibrous loss circulation materials (LCMs) are generally inapplicable to loss circulation zones of moderate to severe loss circulation. Conventional LCMs and associated pills and blends may not be suitable for moderate and severe loss zones (e.g., having gaps and voids of more than 10 millimeters in size). In contrast, embodiments of present fibrous LCMs may form a woven net to subdivide the large flow area (in the gaps or voids) into numerous smaller flow areas. Embodiments of present fibrous LCMs may include a solid central part, radially-distributed centrally-bound elastic fibrous tentacles for enhancing net building, and radially distributed semi-rigid polymer fibers or tentacles for increasing mechanical stability.

Some aspects of the present disclosure are directed to a plurality of LCMs that is an LCM product. The plurality of LCMs may be a plurality of similar or same type LCM or LCM objects. Each LCM has tentacles that are centrally bound. Each LCM object may include the rigid central part as an anchor for the tentacles and to provide support against high pressure and in-situ stress in the wellbore and subterranean formation. The central part may fix the radially distributed tentacles. The central portion as a central solid core may have a width or diameter, for example, in the range of 3 millimeters (mm) to 20 mm. The tentacles (e.g., length in the range of 5 mm to 15 mm) may be distributed (e.g., radially) around the solid central part. The tentacles may include elastic tentacles (e.g., resinous fibers) and semi-rigid tentacles (e.g., polymer fibers). The LCM (each LCM object of the plurality) may have a morphology that is centrally solid and radially fibrous.

In the downhole application of embodiments of this LCM product, a fibrous net or mesh as a flow barrier may form by the radially distributed tentacles of one LCM of the plurality interacting with tentacles of neighboring LCMs of the plurality. These LCMs when reaching and entering into gaps, vugs, fractures, or cavernous holes at the loss circulation zone may provide for the octopus-like working of spreading tentacles to grab or fill space to create a mesh to prevent or reduce the access of other species into the subterranean formation. The elastic and semi-rigid tentacles intertwine among the plurality of LCMs to give the mesh that catches mud solids and additional LCM products in the pill design to form a seal and thus prevent or reduce loss of whole mud. This woven net or network as disposed in gaps, fractures, voids, vugs, etc. of the subsurface loss zones may have mechanical stability and pressure tolerance. The woven network of entangled tentacles may act a catchment for filler material, bridging material or bridging agent, and other LCM products in the LCM pill, blend, or single-sack system design. In implementations, the entanglement of the elastic tentacles along with the entanglement and mechanical support of the semi-rigid polymer fiber-based tentacles facilitate the forming of the stable net-like trough to block particulate LCMs, viscoelastic materials, gel-forming LCMs, and other filler materials to seal against flow of drilling fluid. The net formed by the present LCMs may provide for trapping other LCM components generally and solids, and prevent or reduce the loss of completely drilling mud.

The present LCMs may include a plurality of various sizes of cores and tentacles of semi-rigid and elastic nature. These LCMs may be added (e.g., directly) to carrier fluid or drilling mud to give altered carrier fluid or altered drilling mud to transport and place the LCMs into the loss zones to prevent or reduce loss of whole mud. The present LCMs may have a concentration, for example, in the range of 10 pounds-per-barrel (ppb) to 50 ppb in the carrier fluid or drilling mud. The concentration specified and implemented may depend on (correlative with) the severity of losses encountered while drilling or cementing. As will be appreciated, the sizes and concentration of the present LCMs utilized may be varied depending the mechanism of introduction of the LCMs into the lost circulation zone and on the sizes of gaps, voids, fractures, vugs, etc. of the loss zone. For instance, smaller sizes of the present LCMs (e.g., core diameter less than 10 mm and tentacle length than 7.5 mm) may be added to the fluid (e.g., at a concentration less than 30 ppb) for loss zones having smaller gaps and fractures. On the other hand, larger sizes (e.g., core diameter at least 10 mm and tentacle length at least 7.5 mm) may be added to the fluid (e.g., at a concentration less than 30 ppb) for loss zones having larger gaps and fractures.

A plurality of the present LCMs may have solid-core sizes ranging, for example, from 3 mm to 20 mm (or from 5 mm to 15 mm) and tentacle lengths ranging, for example, from 3 mm to 15 mm (or from 5 to 10 mm). In certain implementations, some tentacles are made of elastic resinous material and some tentacles are made of semi-rigid polymer material to provide a synergy of flexibility and rigidity simultaneously. The core can be made of low-density material (e.g., low-density woody material) to enhance the suspension and transportation efficiency during the placement of the LCMs into the loss zones.

The manufacture of the present LCMs may include arranging tentacles as distributed (e.g., radially) around a solid core. In some implementations, the tentacles may bind to the core via an adhesive. The adhesive may be, for example, polymer adhesive that gives water resistance and oil resistance, and may offer thermal, chemical, mechanical, physical and tribological stability. The adhesive may bind the core and the tentacles together at the core end with tentacle free ends away from the cores. The tentacles may include a plurality of semi-rigid polymer fibers (tentacles) and plurality of elastic resinous fibers (tentacles). The solid core may be low-density material with density (grams/milliliter) ranging, for example, from 1.0 to 1.5 or from 1.1 to 1.3, or less than 1.5. As indicated, the tentacles may be fixed at the core but free at far-ends for interaction with the free-end of tentacles (fibers) of neighboring LCM to form a woven network of tentacles (fibers) to prevent or reduce the loss of whole mud.

A method may be implemented to prevent or reduce moderate to severe lost circulation while drilling or cementing subsurface loss zones of a wellbore. The method may provide a treatment fluid that is carrier fluid or drilling fluid into the wellbore. The carrier fluid or drilling fluid may be water-based or oil-based and have loss control additive(s) including: (1) the present LCMs (can be various sizes) at a concentration ranging, for example, from 5 ppb to 70 ppb; (2) other LCM product(s) (e.g., granular LCMs) and additional solids that act as the bridging and filler material to fill the inter-net gaps of the fibrous net formed by the semi-rigid and the elastic tentacles; and (3) a viscosifier material to increase suspension and transport efficiency of the present LCMs and the additional LCM product(s) and solids. The water-based or oil-based carrier/drilling fluid may include water, mineral oil, synthetic oil, a viscous additive (e.g., XC-polymer, *psyllium* husk, organophilic clay, etc.), a filler phase (e.g., volcanic ash particles, Rev Dust™, etc.), a bridging material (e.g., ARC Plug, Nut plug, etc.), and a plurality of present LCMs having the solid cores and tentacles.

FIG. 1 is an LCM object 100. Multiple LCM objects 100 may be utilized collectively as LCM to treat loss circulation in a wellbore in a subterranean formation. The LCM object 100 may be labeled as an LCM particle or LCM individual structure, and the like. The LCM object 100 includes a core 102 (e.g., a spherical core) that is a solid or substantially solid. Thus, the core 102 may be labeled generally as a solid core 102. Tentacles 104, 106 (e.g., fibers) are attached to and extend from the core 102. The tentacles include first tentacles 104 and second tentacles 106. The material of the first tentacles 104 may be different than the material of the second tentacles 106. The first tentacles 104 may be elastic and the second tentacles 106 may be semi-rigid. The presence of the two different types of tentacles may provide a synergy in forming a flow barrier to treat loss circulation, as discussed below. The presence of both elastic tentacles and semi-rigid tentacles may provide for a synergy of simultaneous flexibility and rigidity to form and maintain the mat of intertwined or entangled tentacles (elongated fibers). The semi-rigid tentacles may provide for structural rigidity of the network or scaffolding effect so that formed tentacle (fiber) network can tolerate the downhole overbalance pressure, such as 100 pounds per square inch (psi) to 500 psi. The rigid tentacles or structures may facilitate the elastic tentacles to create a network with small voids and gaps that can be filled by mud particles (e.g., micro-sized) and the filler materials. Without a rigid support structure provided by semi-rigid tentacles, the elastic tentacles may not be as effective to make a stable woven network to trap the fillers and mud particles.

In the illustrated embodiment, the core 102 is a centrally-disposed component of the LCM object 100. The core 102 may be at a center portion of the LCM object 100. As for shape, the core 102 may be generally spherical, as depicted. The core 102 may be a solid sphere. The use of the terms sphere and spherical herein can mean less than a perfect sphere, such as substantially spherical. The core 102 can be shapes other than spherical. For example, the core 102 can be spheroid, ovoid, cuboid, a pentahedron, disc-shaped, or an irregular shape, and so on. The solid core 102 may have a width or diameter, for example, in the range of 3 mm to 20 mm, or less than 20 mm. The width or diameter may be 5 mm, 10 mm, 15 mm, at least 5 mm, at least 10 mm, or at least 15 mm. The solid core 102 may have strength and toughness to typically withstand downhole pressure and temperature to generally maintain shape of the core 102. In embodiments of application of the LCM object 100, the core 102 is not crushed or significantly deformed. In implementations, the solid core 102 may have a density, for example, in the ranges of 1.1 grams per milliliter g/mL) to 1.5 g/mL or 1.1 g/mL to 1.3 g/mL, or at least 1.1 g/mL, or less than 1.5 g/mL. In certain embodiments, the solid core 102 may be manufactured by traditional subtraction manufacturing, molding (e.g., injection molding, cast molding, extrusion molding, etc.), or addition manufacturing (or three dimensional printing). Other manufacturing techniques are applicable. In some embodiments, the solid core 102 may be a low-density woody material, which may be, for example, pressed wood, compressed wood, teak wood (tropical hardwood in the family Lamiacea), lignum vitae (guayacan or guaiacum), ebony wood, and the like. Pressed wood may be an engineered construction material made from wood veneers, wood shavings and particles, sawdust or wood fibers bonded together with an adhesive under heat and pressure.

In implementations, one end of each tentacle 104, 106 is attached (e.g., via an adhesive) to the surface of the core 102, and the opposite end of each tentacle 104, 106 is a free end (not attached to the core 102). In application, the free-end portions of the tentacles 104, 106 may interact with free-end portions of tentacles of neighboring LCM objects 100. The tentacles 104, 106 may each be a fiber (an elongated fiber). The length of the tentacles 104, 106 may be, for example in the ranges of 3 mm to 15 mm or 5 mm to 10 mm, or at least 5 mm, at least 7.5 mm, or at least 10 mm, or less than 20 mm. FIG. 1 can be considered a cross-sectional view. However, for clarity with FIG. 1 instead as similar to a perspective view, tentacles 104, 106 in the forefront are not shown so not to obstruct view of the core 102 in the depiction. It is to be understood that tentacles 104, 106 will exist in the forefront. The tentacles 104, 106 are distributed around the core 102. In the illustrated embodiment, the first tentacles 104 may be multiple elastic tentacles 104 (e.g., each a resin fiber). The second tentacles 106 may be multiple semi-rigid tentacles 106 (e.g., each a polymer fiber). The percentage elongation at break of the first tentacles 104 as elastic tentacles is greater than the percentage elongation at break of the second tentacles 106 as semi-rigid tentacles. The first tentacles 104 as elastic tentacles may have a percentage elongation at break, for example, in the range of 100% to 200% of the original length of the tentacle. The second tentacles 106 as semi-rigid tentacles may have a percentage elongation at break, for example, in the range of 3% to 10% of the original length of the tentacle. The Young's modulus of the second tentacles 106 as semi-rigid tentacles is greater than the Young's modulus of the first tentacles 104 as elastic tentacles. The Young's modulus of the second tentacles 106 as semi-rigid tentacles may be, for example at least 1000 megapascals (MPa). The first tentacles 104 as elastic tentacles may be a resinous or resin fiber, such as bioresin fibers or synthetic resin fibers. The elastic tentacles 104 may have a diameter, for example, in ranges of 0.5 mm to 2 mm, or 1 mm to 2 mm, or at least 0.5 mm, or less than 3 mm. The second tentacles 106 as semi-rigid tentacles may be polymer fibers, such as polypropylene fibers, polyurethane fibers, polyethylene fibers, polyacrylonitrile (PAN) fibers, aramid fibers, and so forth. The semi-rigid tentacles 106 may have a diameter, for example, in ranges of 0.25 mm to 1.5 mm, or 0.75 mm to 1 mm, or at least 0.25 mm, or less than 2 mm. The tentacles 104, 106 may be attached via an adhesive to the surface (e.g., external or exterior surface) of the solid core, and wherein the tentacles 104, 106 are distributed around the core 102. The adhesive may be a polymer adhesive. The adhesive may be polyvinyl-acetate (PVA) glue, wood glue, PVA wood glue, Kaurit glue synthetic-resin glue, urea-formaldehyde-resin type, amino-aldehyde-resin type, Titebond wood glue (e.g., Titebond-III), and so on.

Loss circulation may occur in drilling or cementing operations. In a drilling operation, drilling fluid may be pumped via mud pumps into a wellbore through a drill string to a drill bit (at the bottom of the wellbore) that breaks rock to drill the borehole. The drilling fluid may discharge from nozzles on the drill bit and flow back up through an annulus to Earth surface. The annulus may be between the wellbore wall (formation surface) and the drill string, or between the wellbore wall (formation) and wellbore casing in which the drill string is inserted. Some or all of the drilling fluid returning through the annulus to the Earth surface may be lost into the subterranean formation at the loss circulation zone in the wellbore.

In cementing, the cement slurry may be pumped from the Earth surface into the wellbore down the interior of the casing and then upward from the bottom through the annulus between the casing and the formation. When the cement reaches the loss circulation zone, the cement does not adequately continue upward. The loss of cement slurries to such thief zones can cause problems during cementing including resulting in inadequate amounts of cement slurry in the annulus between the casing and the subterranean formation. The inadequate amounts of cement slurry could lead to poor zonal isolation during the subsequent production of hydrocarbon from the subterranean formation through the wellbore to the Earth surface.

Figure 2:
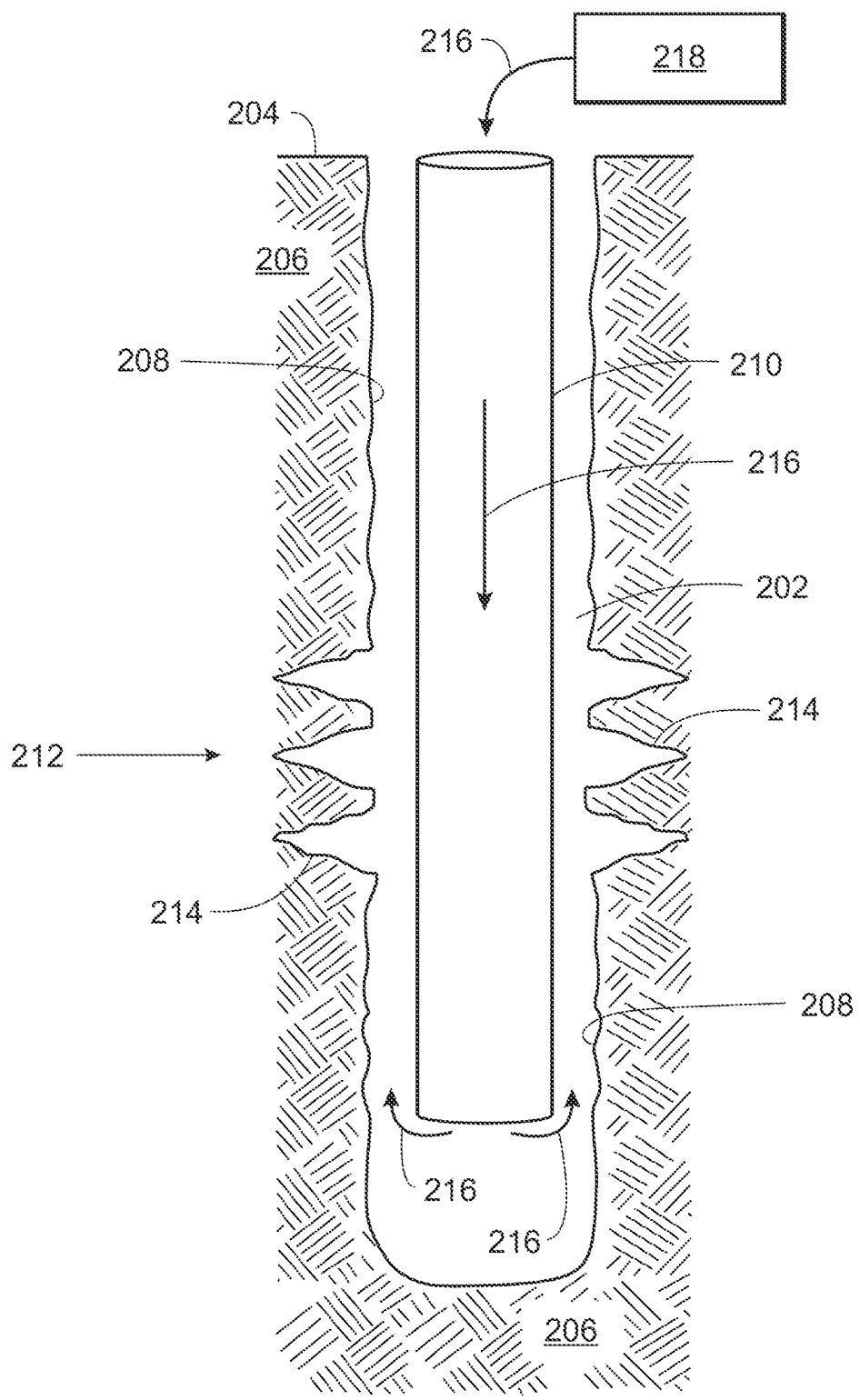
FIG. 2 is a diagram of a well site.

FIG. 2 is a well site 200 having a wellbore 202 through the Earth surface 204 into a subterranean formation 206 in the Earth crust. The subterranean 206 may also be labeled as a geological formation, hydrocarbon formation, reservoir, etc. Hydrocarbon may be produced from the subterranean formation 206 through the wellbore 202 to the surface 204. The hydrocarbon may be crude oil or natural gas, or both. To form the wellbore 202, a hole (borehole) is drilled into the subterranean formation 206 to generate a drilled formation surface 208 as an interface for the wellbore 202 with the subterranean formation 206. The formation surface 208 may be characterized as the wellbore 202 wall. The wellbore 202 may have openhole portions but generally includes a cylindrical casing 210 as shown. The wellbore 202 in the depicted implementation of FIG. 2 is a cased wellbore 202. In the illustrated embodiment, the wellbore 202 has a loss circulation zone 212 caused by loss-circulation features 214 of the subterranean formation 206 at that portion of the wellbore 202. The loss-circulation features 214 along the wellbore 202 at the loss circulation zone 212 cause or contribute to the loss circulation. The loss-circulation features 214 are structural features or characteristics of the subterranean formation 206 at or near the wellbore 202. The features 214 may be fractures, voids, vugulars (vugs), gaps, permeable channels, cavities, cavernous openings, etc. A vugular may be a cavity in subterranean rock and can be lined with mineral precipitates.

In a drilling operation, drilling fluid (mud) introduced from the surface 204 flowing downward through the casing 210 (and drill string) discharges from the drill bit (not shown) at the bottom of the wellbore 202, and flows upward through the annulus between the subterranean formation 206 and the casing 210 toward the surface 204 as return drilling fluid. Some or all of the drilling fluid flowing upward through the annulus may be lost through the features 214 into the subterranean formation 206 at the loss circulation zone 212 in the wellbore 202.

For a cementing operation (e.g., primary cementing), the cement slurry may be introduced from the surface 204 into the casing 210 in the wellbore 202 and discharges from the bottom of the casing 210. The cement slurry then flows up through the annulus between the formation 206 and the casing 210 toward the surface 204. The cement slurry flowing upward in the annulus may be lost through the features 214 into the subterranean formation 206 at the loss circulation zone 212.

The present LCMs (e.g., FIG. 1) discussed above may be utilized to treat the loss circulation zone 212 to cure the loss circulation. This LCM having a central core with tentacles extending from the core may be applied to the loss-circulation features 214 (e.g., to seal the features 214) to reduce or prevent flow of drilling fluid or cement slurry through the features 214 into the subterranean formation 206. A treatment fluid 216 having LCM that includes multiple LCM objects 100 (FIG. 1) or similar LCM objects may be introduced (e.g., pumped) into the wellbore 202. The treatment fluid 216 may be pumped by a surface pump (e.g., mud pump) of the surface equipment 218 at the surface 204. In certain implementations, the pump may be associated with a drilling rig. The pump(s) can be skid-mounted in some instances. The pump may be a centrifugal pump, positive displacement (PD) pump, reciprocating PD pump such as a piston or plunger pump, and so on. The surface equipment 218 may include equipment (e.g., vessels, solid-handling equipment, piping, pumps etc.) to incorporate LCM objects 100, viscosifier, and solids (e.g., filler material, bridging material, other LCM products, etc.) into the treatment fluid 216. The solids are in addition to LCM objects 100. The surface equipment 218 may include equipment to support other operations at the well site 200.

The treatment fluid 216 may be, for example, drilling fluid (mud) or carrier fluid. The treatment fluid 216 may be oil-based or water-based. The treatment fluid 216 may include water, mineral oil, synthetic oil, a viscous additive (viscosifier), and so forth. The viscosifier may be, for example, bentonite, XC-polymer, or starch for water-based treatment fluid 216. The viscosifier may be, for example, organophilic clay for oil-based treatment fluid 216. The treatment fluid 216 may be labeled as a treatment slurry in that the treatment fluid 216 includes the LCM objects 100 and other solids. In implementations, the treatment fluid 216 having the LCM objects 100 may be labeled or characterized as an LCM pill. In general, a pill may be a relatively small quantity or volume (e.g., less than 500 barrels) of drilling fluid or carrier fluid as a specified blend utilized for a particular purpose in treating the wellbore 202 or subterranean formation 206.

The core size (e.g., diameter) and tentacle length of the LCM objects 100 included in the treatment fluid 216 may be specified in response to (correlative with) size (e.g., cross-sectional area) of the features 214 (e.g., fractures, gaps, channels, cavities, openings) of the subterranean formation 206 at the loss circulation zone 212. For instance, a core diameter less than 10 mm and tentacle length less than 7.5 mm may be specified for a loss circulation zone 112 having features 114 of smaller size, and a core diameter greater than 10 mm and tentacle length greater than 7.5 mm may be specified for a loss circulation zone 112 having features 114 of larger size. Other correlative examples are applicable. Further, a mix of LCM objects 100 of different sizes (cores, tentacles) may be included in the treatment fluid 216 for the same treatment job to provide a synergy between the LCM objects 100 in forming the barrier over the features 214. A mix of LCM objects 100 of different sizes may be included in the treatment fluid 216 for the same treatment job in response to a loss circulation zone 212 having features 214 of varying or different sizes. The concentration of the LCM objects 100 in the treatment fluid 216 may be, for example, in the range of 5 ppb to 100 ppb, or at least 30 ppb. Additional solids (not the LCM objects 100) in the treatment fluid 216 may be, for example, as a concentration of less than 100 ppb in the treatment fluid 216.

In the downhole application, the present LCM product (e.g., LCM objects 100 of FIG. 1) may form a fibrous net or mesh as a flow barrier at and in the loss-circulation features 214. The tentacles of an LCM object 100 may entangle with tentacles of neighboring LCM objects 100 to form the net. Then, initially, liquid (e.g., base fluid) of the treatment fluid 216 may pass through voids or gaps in the formed net of entangled tentacles into the subterranean formation 206 but the net captures solids from the treatment fluid 216. The solids collected on the intertwined-tentacle net fills or plugs the gaps or voids in the net of tentacles to form a flow barrier that blocks flow of most or all of the treatment fluid 216 (and wellbore fluid generally) including both liquid and solids. When the LCM is applied, initially liquid in the treatment fluid 216 (e.g., drilling fluid or drilling mud) flows from within the wellbore 202 around and in between the intertwined tentacles of the applied LCM into the formation 206 until the solids collect to bridge or plug the LCM. After the entry of the tentacular LCMs into the features 214 (e.g., gaps, voids, fractures, vugs, etc.) of the loss zone 212, the LCMs create a woven or partially-woven netlike barrier with small pores and gaps that can be sealed and blocked by the solids (e.g., small particles of the mud system and also filler materials).

As indicated, additional solids (e.g., less than 100 ppb) may be added along with the LCM objects 100 (e.g., also less than 100 ppb) to the treatment fluid 216 at the surface 204. The combination of LCM objects 100 and the additional solids may be less than 200 ppb in the treatment fluid 216. The added solids may include other LCM products as filler solids that can be collected by the tentacle net to advance formation of the flow barrier. The added solids may generally include filler solids that may be labeled as filler material or bridging material. In application, the filler solids as particles suspended in the treatment fluid 216 may be collected and trapped by the tentacles networks formed by the interacting multiple LCM objects 100. The filler solids may increase rigidity of the plugging of the voids in the tentacle net and improve the seal provided by the formed barrier. The filler solids may include small particles having, for example, an effective diameter less than 2 mm in effective diameter down to micron scale (e.g., 100 microns). The filler solids may include volcanic ash (generally non-swelling), bentonite (generally swelling), Rev Dust™ (generally non-reactive), ARC Plug or Nut plug (both known as bridging material), and the like. Again, these filler solids as filler material or bridging material may typically be collected across the network of LCM objects 100 intertwined tentacles and solid cores at the loss-circulation features 214. The filler solids as small particles can file the gaps and voids between tentacles in the networks of entangled tentacles among the multiple LCM objects 100 applied at the loss circulation zone 212. A blend design may be implemented in which two or more blends of the additives may be prepared in advanced, and then added to the treatment fluid 216 at the surface 204 at the time of application. In some embodiments, a single sack for the LCM pill system may be implemented in which the LCM objects 100 and other aforementioned additives are pre-mixed and added to the drilling mud (or carrier fluid) to give the treatment fluid 216. Such may save time, and accelerate the mixing process and improve the slurry quality. Single sack typically has all the components in one sack so that contents can be mixed at the same time at the same rate by pouring a single sack into, for example, the mud mixing hopper.

Application of the LCM objects 100 as LCM product may be intended for loss circulation zones in the wellbore that are at non-reservoir sections of the subterranean formation. Therefore, in the subsequent production of hydrocarbon from the subterranean formation, the LCM objects 100 may remain in place at the lost circulation zone. However, if the LCM objects 100 are applied at a loss circulation zone in a reservoir section of the subterranean formation, the tentacles of the LCM objects 100 may be specified as dissolvable in oil if desired. Thus, in certain instances, the tentacles of the applied LCM objects 100 may dissolve when the hydrocarbon (e.g., oil) production starts. Dissolution of the hydrocarbon-dissolvable tentacles may loosen the seal or plug and remnants of the LCM objects 100 flow into the wellbore opening the features 214.

Figure 3:
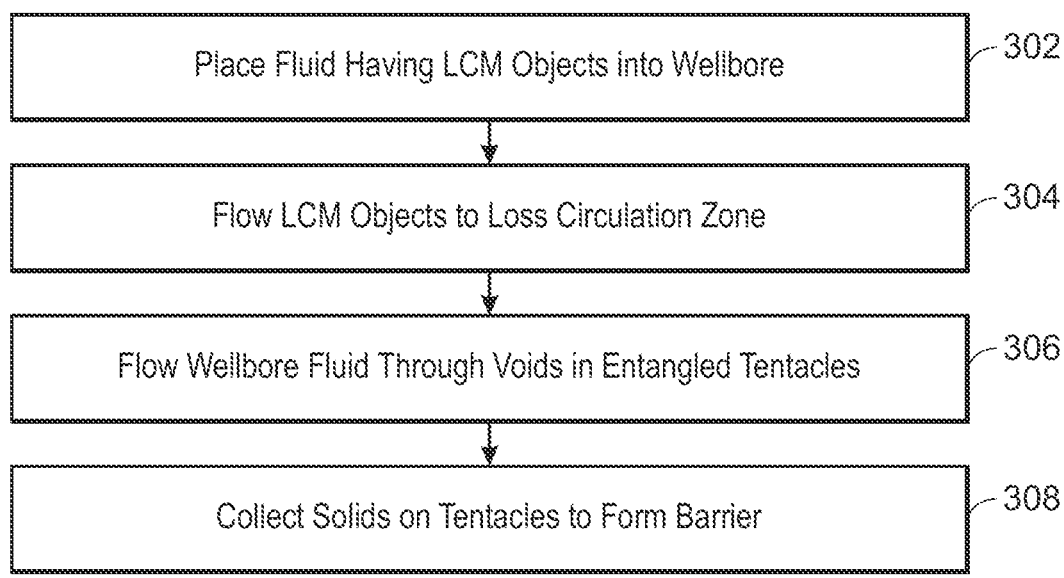
FIG. 3 is a block flow diagram of a method of treating loss circulation in a wellbore in a subterranean formation.

FIG. 3 is a method 300 of treating loss circulation in a wellbore in a subterranean formation. At block 302, the method includes placing fluid having LCM objects (e.g., LCM objects 100 as in FIG. 1) into the wellbore. Each LCM object has tentacles and a centrally-disposed solid core, and wherein the tentacles are attached to and extend from the centrally-disposed solid core. The tentacles may be attached via an adhesive to the solid core. In implementations, for each of the LCM objects, an end of each tentacle is attached to the centrally-disposed solid core and an opposite end of each tentacle is not attached to the centrally-disposed solid core. In implementations, for each of the LCM objects, the tentacles include first tentacles that are resin tentacles and second tentacles that are polymer tentacles different in material than the resin tentacles. The tentacles may be elongated fibers with an end of each elongated fiber attached to the centrally-disposed solid core. The elongated fibers may include resin fibers and polymer fibers. In implementations, for each of the LCM objects, the centrally-disposed solid core is generally spherical and the tentacles include at least 30 tentacles distributed radially around the centrally-disposed solid core. The concentration of the LCM objects in the fluid placed into the wellbore may be, for example, less than 100 ppb. The fluid may be characterized as a treatment fluid. The fluid may be drilling fluid or a carrier fluid. The placing of the fluid into the wellbore may involve pumping the fluid having the LCM objects into the wellbore.

At block 304, the method includes flowing the LCM objects to against the subterranean formation at a loss circulation zone in the wellbore, wherein the tentacles (e.g., as appendages of the solid cores) entangle between the LCM objects. The tentacles may intertwine between the solid cores. The tentacles attached to a solid core may form a partially-woven network with tentacles attached to neighboring solid cores. The flowing of the LCM objects to against the subterranean formation may involve flowing the LCM objects to against or in features (e.g., fractures, gaps, etc.) of the subterranean formation that contribute to loss circulation at the loss circulation zone.

At block 306, the method includes flowing wellbore fluid from the wellbore into the subterranean formation through voids between the tentacles as entangled at the loss circulation zone. The method initially allows loss of the wellbore fluid into the subterranean formation through the voids of the entangled tentacles so that the entangled tentacles can collect (block 308) solids from the wellbore fluid. The wellbore fluid in the wellbore may include the aforementioned fluid placed (block 302) into the wellbore.

At block 308, the method includes collecting solids on the tentacles as entangled from the wellbore fluid (flowing through the voids) to form a barrier (e.g., formed across voids and solid cores of the entangled tentacle network) to treat the loss circulation at the loss circulation zone. To treat the loss circulation may stop or reduce flow of the wellbore fluid into the subterranean formation at the loss circulation zone. The collecting of the solids may form the barrier as a flow barrier across the voids between the tentacles as entangled. The forming of the barrier may involve the collecting of solids fouling the voids. In implementations, flow of the wellbore fluid into the subterranean formation through the voids between the tentacles as entangled is stopped or reduced due to formation of the barrier over or in the voids. The solids collected may include bridging material, filler material, or LCM that is not the LCM objects, or any combinations thereof. The aforementioned fluid placed (block 302) into the wellbore may include the solids.

An embodiment is a method of applying LCM to a wellbore in a subterranean formation. The method includes pumping a slurry having base fluid (e.g., drilling fluid or a carrier fluid), LCM objects, and solids into the wellbore to a loss circulation zone in the wellbore. The LCM objects have solid cores and tentacles attached to and extending from the solid cores. In implementations, an end of each tentacle is attached to a respective solid core of the solid cores and an opposite end of each tentacle is a free end. The tentacles may include first tentacles that are resin and second tentacles that are polymer (different than the resin). The method includes allowing the tentacles to entangle between the solid cores at the loss circulation zone. The method includes flowing the base fluid through gaps between the tentacles as entangled into the subterranean formation at the loss circulation zone. The method includes collecting the solids on the tentacles as entangled to form a flow barrier to reduce or prevent loss circulation at the loss circulation zone. To reduce or prevent loss circulation at the loss circulation zone may include to reduce or prevent flow of wellbore flow into the subterranean formation at the loss circulation zone. The tentacles as entangled may form a partially-woven network to collect the solids, and wherein the partially-woven network includes the gaps to initially allow the base fluid to flow into the subterranean formation. The flowing of the base fluid into the subterranean formation through the gaps may be stopped or reduced due to formation of the flow barrier. To form the flow barrier may involve the collecting of the solids plugging (sealing) the gaps.

Another embodiment is an (LCM) object to be placed into a wellbore in a subterranean formation to cure loss circulation in the wellbore. Multiple of the LCM objects collectively (similar or same type LCM objects) are placed contemporaneously into the wellbore as an LCM. The LCM object has a solid core that is centrally disposed in the LCM object. The LCM object has tentacles including first tentacles and second tentacles. The second tentacles are different in material than the first tentacles. The tentacles are attached to the solid core and extend from the solid core to interface (interact, entangle) with tentacles of a neighboring LCM object. The tentacles may be attached (e.g., via an adhesive) to a surface (e.g., external or exterior surface) of the solid core, and wherein the tentacles are distributed around the core. The tentacles may be at least 30 tentacles (or at least 50 tentacles). The first tentacles may be at least 15 tentacles (or at least 25 tentacles). The second tentacles may be at least 15 tentacles (or at least 25 tentacles). In implementations, each first tentacle of the first tentacles is an elongated resin fiber and each second tentacle of the second tentacles is an elongated polymer fiber. In implementations, each first tentacle of the first tentacles is an elastic resinous fiber and each second tentacle of the second tentacles is a semi-rigid polymer fiber. In implementations, an end of each tentacle of the tentacles is attached to the solid core and an opposite end of each tentacle of the tentacles is not attached to the solid core. The tentacles may be less than 15 millimeters (mm) in length. Each tentacle of the tentacles may have a diameter less than 1.5 mm. The solid core may have a width or diameter less than 20 mm. The solid core may be spherical, and wherein the tentacles are distributed radially around the solid core. The density of the solid core may be less than 1.5 g/mL.

Yet another embodiment is an LCM pill to cure loss circulation in a wellbore in a subterranean formation. The LCM pill includes LCM objects (e.g., LCM object 100 of FIG. 1). Each LCM object of the LCM objects has a solid core and tentacles (e.g., elongated fibers) attached to and extending from the solid core. In implementations, the solid core has a width or diameter less than 20 mm and a density less than 1.5 g/mL. In implementations, the tentacles are less than 15 mm in length, wherein each tentacle of the tentacles comprises a diameter less than 1.5 mm. The tentacles attached to the solid core include first tentacles and second tentacles. The second tentacles are different in material than the first tentacles. In implementations, the tentacles are at least 30 tentacles, wherein the first tentacles are at least 15 tentacles, and wherein the second tentacles are at least 15 tentacles. In implementations, each tentacle of the first tentacles is an elastic resin fiber, and wherein each tentacle of the second tentacles is a semi-rigid polymer fiber. In implementations, the tentacles are attached to a surface of the solid core, and wherein the tentacles are distributed around the solid core. The solid core may be a spherical solid core, and wherein the tentacles are distributed radially around the spherical solid core. In implementations, an end of each tentacle is attached to the solid core, wherein an opposite end of each tentacle is not attached to the solid core. The LCM pill includes fluid (e.g., treatment fluid, drilling fluid, carrier fluid, etc.) to convey the LCM objects into the wellbore. In implementations, concentration of the LCM objects in the fluid is less than 100 ppb. The LCM pill includes solids (e.g., also less than 100 ppb) to be collected on the LCM objects in application. The solids are in addition to the LCM objects. The solids may include, for example, bridging material, filler material, or LCM not the LCM objects, or any combinations thereof.

Tables 1-4 below give Examples of treatment fluids that may deploy the present LCM (e.g., FIG. 1) into a wellbore for the treatment of loss circulation. As discussed, the present LCM can be shaped LCM having semi-rigid tentacles and elastic resilient tentacles. The treatment fluids (Tables 1-4) are indicated as drilling fluids and may be altered at least with respect to incorporating the present LCM. These treatment fluids noted as drilling fluids in Tables 1-4 can be carrier fluid. The treatment fluids may have an aqueous fluid phase or a non-aqueous fluid phase. The aqueous phase can be fresh water, monovalent salt water, or divalent salt water, and so forth. The non-aqueous phase can be, for example, mineral oil or synthetic oil, and the like. As indicated in Tables 1-4, Examples of the treatment fluid (e.g., drilling fluid) can include a viscosifier, a fluid loss additive, and calcium carbonate (CaCO3). The CaCO3 can be granular as coarse particles (C), medium particles (M), or fine particles (F), or any combinations thereof. The viscosifier can be, for instance, a polysaccharide (e.g., xanthan gum or XC polymer), a carboxymethyl cellulose (CMC), or a cellulose derivative (e.g., polyanionic cellulose or PAC), or any combinations thereof. The fluid loss additive can be, for example, starch, *psyllium* husk powder, or a polyanionic cellulose polymer (e.g., PAC LV™ available from AMC Drilling Optimisation of Balcatta, Western Australia, Australia), or any combinations thereof. The present LCM (e.g., shaped LCM having tentacles) can be, for example, 10-30 pounds/barrel of the altered drill-in fluid.

The ARC Ecofibers M, ARC Plug, and ARC ResiLCM 3 mm given in Tables 1-4 are products developed by Saudi Arabian Oil Company (having headquarters in Dhahran, Saudi Arabia) and manufactured by companies under business and commercialization license. These materials fibrous, particulate, and resilient loss circulation materials. The given names are product names. The acronym "ARC" is Advanced Research Center. The letter "M" means medium grade. The "3 mm" refers to mesh size. The ARC Ecofibers M are palm tree waste-based fibrous LCM. The ARC plug is date seed waste-based particulate LCMs. The ARC ResiLCM 3 mm is scrap tire-based resilient rubber particles. Similar alternatives to these products are Barofiber, Nut Plug and Steelseal. Invermul and EZ-mul given in Table 4 are examples of emulsifiers. Other emulsifiers may be employed in addition to or in lieu of Invermul and EZ-mul. Invermul is Invermul® NT that is an emulsifier to stabilize emulsions and that may be a primary emulsifier for mineral oil based drilling-fluid systems. EZ-mul is EZ Mule® that may be both an emulsifier (e.g., secondary emulsifier) and oil-wetting agent for oil based drilling fluid systems. Both Invermule® NT and EZ Mule® are available from Halliburton Corporation having headquarters in Houston, Tex., USA. Invermule® NT includes hydrotreated light petroleum distillate, fatty acid, tall oil reaction products, ethylene glycol monobutyl ether, diethylene glycol monobutyl ether, and Halliburton product. EZ Mule® is a Halliburton Baroid product that is blend of ethylene glycol monobutyl ether and diethylene glycol monobutyl ether for mineral and paraffin oil-based drilling muds.

The units in Tables 1-4 below are cubic centimeter (cc) or grams (g). The volumes of the water (fresh water or salt water) (Tables 1-3) are given as a reference basis with respect to the associated remaining components in the given Table. The volumes of the oil (mineral oil or synthetic) in Table 4 are given as a basis with respect to the associated remaining components in Table 4.

TABLE 1

Fresh Water-Based Altered Drill-In Fluid System

| Components | Quantity | Range |
|---|---|---|
| Fresh Water (cc) | 331 | 250-400 |
| XC Polymer (g) | 1.5 | 0.5-3.5 |
| Modified Starch (g) | 6 | 2-10 |
| Biocide (cc) | 0.5 | <1 |
| NaOH (g) | 0.3 | <0.8 |
| CaCO3, F (g) | 20 | 5-40 |
| CaCO3, M (g) | 10 | 3-30 |
| CaCO3, C (g) | 5 | <10 |
| ARC Ecofibers M (g) | 20 | 5-40 |
| ARC Plug (g) | 15 | 3-30 |
| ARC ResiLCM 3 mm (g) | 15 | 3-30 |
| Shaped LCMs having Tentacles (g) | 15 | 5-40 |

TABLE 2

Monovalent Salt Water-Based Altered Drilling Fluid System

| Components | Quantity | Range |
|---|---|---|
| Water (cc) | 296 | 220-380 |
| NaCl (g) | 75 | 50-100 |
| XC Polymer (g) | 1.5 | 0.5-3.5 |
| Modified Starch (g) | 6 | 2-10 |
| Biocide (cc) | 0.5 | <1 |
| NaOH (g) | 0.3 | <0.8 |
| CaCO3, F (g) | 20 | 5-40 |
| CaCO3, M (g) | 10 | 3-30 |
| CaCO3, C (g) | 5 | <10 |
| ARC Ecofibers M (g) | 20 | 5-40 |
| ARC Plug (g) | 15 | 3-30 |
| ARC ResiLCM 3 mm (g) | 15 | 3-30 |
| Shaped LCMs having Tentacles (g) | 15 | 5-40 |

TABLE 3

Divalent Salt Water-Based Altered Drilling Fluid System

| Components | Quantity | Range |
|---|---|---|
| Water (cc) | 287 | 200-350 |
| CaCl$_2$ (g) | 100 | 50-150 |
| XC Polymer (g) | 1.5 | 0.5-3.5 |
| Modified Starch (g) | 6 | 2-10 |
| Biocide (cc) | 0.5 | <1 |
| NaOH (g) | 0.3 | <0.8 |
| CaCO3, F (g) | 20 | 5-40 |
| CaCO3, M (g) | 10 | 3-30 |
| CaCO3, C (g) | 5 | <10 |
| ARC Ecofibers M (g) | 20 | 5-40 |
| ARC Plug (g) | 15 | 3-30 |
| ARC ResiLCM 3 mm (g) | 15 | 3-30 |
| Shaped LCMs having Tentacles (g) | 15 | 5-40 |

TABLE 4

Non-Aqueous Drill-In Fluid System (Mineral Oil or Synthetic Oil)

| Components | Mineral Oil-Based Mud | Mineral Oil-Based Mud | Synthetic Oil-Based Mud | Synthetic Oil-Based Mud |
|---|---|---|---|---|
| Base Oil (cc) | 186 | 150-220 | 186 | 150-220 |
| Invermul (cc) | 10 | 5-15 | 10 | 5-15 |
| EZ-mul (cc) | 6 | <10 | 6 | <10 |
| Lime (gm) | 5 | <9 | 5 | <9 |
| Viscosifier (g) | 6 | 2-10 | 6 | 2-10 |
| Fluid Loss Additive (g) | 7 | 3-12 | 7 | 3-12 |
| Water (cc) | 84 | 50-120 | 84 | 50-120 |
| CaCl$_2$ (g) | 61 | 20-100 | 61 | 20-100 |
| CaCO$_3$ F (g) | 25 | 10-40 | 65 | 40-90 |
| CaCO$_3$ M (g) | 20 | 5-35 | 65 | 40-90 |
| CaCO$_3$ C (g) | 15 | 3-30 | 65 | 40-90 |
| ARC Ecofibers M (g) | 20 | 5-40 | 20 | 5-40 |
| ARC Plug (g) | 15 | 3-30 | 15 | 3-30 |
| ARC ResiLCM 3 mm (g) | 15 | 3-30 | 15 | 3-30 |
| Shaped LCMs having Tentacles (g) | 15 | 5-25 | 15 | 5-25 |

A number of implementations have been described. Nevertheless, it will be understood that various modifications may be made without departing from the spirit and scope of the disclosure.

What is claimed is:

1. A lost circulation material (LCM) object comprising:
a solid core comprising wood and that is centrally disposed in the LCM object; and
tentacles comprising first tentacles and second tentacles different in material than the first tentacles, the tentacles attached to the solid core and extending from the solid core to entangle with other tentacles of a neighboring LCM object, wherein the first tentacles comprise a greater percentage elongation at break and a lower Young's modulus than the second tentacles, wherein the LCM object is configured to be placed into a wellbore in a subterranean formation to collect solids on the tentacles as entangled to form a flow barrier to cure loss circulation in the wellbore, and wherein the first tentacles and the second tentacles are configured to provide a synergy in forming the flow barrier because of the first tentacles comprising a greater percentage elongation at break and a lower Young's modulus than the second tentacles.

2. The LCM object of claim 1, wherein the tentacles are attached to a surface of the solid core, and wherein the tentacles are distributed around the solid core.

3. The LCM object of claim 2, wherein the tentacles are attached to the surface of the solid core via an adhesive, and wherein the tentacles are less than 15 millimeters (mm) in length.

4. The LCM object of claim 1, wherein the solid core is spherical, and wherein the tentacles are distributed radially around the solid core.

5. The LCM object of claim 1, wherein an end of each tentacle of the tentacles is attached to the solid core and an opposite end of each tentacle of the tentacles is not attached to the solid core, wherein the tentacles comprise at least 30 tentacles, wherein the first tentacles comprise at least 15 tentacles, and wherein the second tentacles comprises at least 15 tentacles.

6. The LCM object of claim 1, wherein each first tentacle of the first tentacles is an elongated resin fiber, wherein each second tentacle of the second tentacles is an elongated polymer fiber.

7. The LCM object of claim 1, wherein each tentacle of the first tentacles is an elastic resinous fiber, and wherein each tentacle of the second tentacles is a semi-rigid polymer fiber.

8. The LCM object of claim 1, wherein the solid core comprises a width less than 20 mm, wherein each tentacle of the tentacles comprises a diameter less than 1.5 mm.

9. The LCM object of claim 1, wherein the solid core comprises a diameter less than 20 mm, and wherein density of the solid core is less than 1.5 gram per milliliter.

* * * * *